United States Patent
Qiu

(10) Patent No.: US 9,213,441 B2
(45) Date of Patent: Dec. 15, 2015

(54) IN-CELL TOUCH PANEL AND LIQUID CRYSTAL DEVICE

(71) Applicant: Shenzhen China Star Optoelectronics Technology Co., Ltd., Shenzhen, Guangdong (CN)

(72) Inventor: Jie Qiu, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 112 days.

(21) Appl. No.: 14/112,546

(22) PCT Filed: Sep. 12, 2013

(86) PCT No.: PCT/CN2013/083416
§ 371 (c)(1),
(2) Date: Oct. 18, 2013

(87) PCT Pub. No.: WO2015/032107
PCT Pub. Date: Mar. 12, 2015

(65) Prior Publication Data
US 2015/0070285 A1   Mar. 12, 2015

(30) Foreign Application Priority Data
Sep. 6, 2013  (CN) .......................... 2013 1 0405025

(51) Int. Cl.
G06F 3/041   (2006.01)
G06F 3/042   (2006.01)

(52) U.S. Cl.
CPC .............. *G06F 3/042* (2013.01); *G06F 3/0412* (2013.01)

(58) Field of Classification Search
CPC ........................................................ G06F 1/692
USPC ........................................................ 345/173
See application file for complete search history.

(56) References Cited

U.S. PATENT DOCUMENTS

2014/0152921 A1*  6/2014  Yashiro et al. .................. 349/12

\* cited by examiner

*Primary Examiner* — Amare Mengistu
*Assistant Examiner* — Joseph G Rodriguez
(74) *Attorney, Agent, or Firm* — Andrew C. Cheng

(57) ABSTRACT

An in-cell touch panel and a liquid crystal device are disclosed. The in-cell touch panel includes a first substrate having a plurality of displaying pixels, a second substrate facing toward the first substrate, a liquid crystal layer arranged between the first substrate and the second substrate, a plurality of touching units, and a plurality of sensing areas and driving areas. The displaying pixels include thin film transistors (TFT) and pixel electrodes. The second substrate includes a plurality of color filtering patterns corresponding to the displaying pixels. The touching units are arranged between the TFTs and the first substrate, and are separated from each other. The sensing areas and the driving areas are arranged below the common electrodes. In addition, the sensing areas and the driving area connect to the touching units via the conductive through holes.

14 Claims, 4 Drawing Sheets

IN-CELL TOUCH PANEL AND LIQUID CRYSTAL DEVICE

BACKGROUND OF THE INVENTION

1. Field of the Invention

The present disclosure relates to touch panel technology, and more particularly to an in-cell touch panel and the liquid crystal device.

2. Discussion of the Related Art

Touch panel is an input device for users to use fingers or other objects to select instructions shown on the display panel so as to input users commands. Users fingers or other objects directly contact with the touch panel to replace the input devices, such as keyboards and mouse that are connected to the display device. Thus, the touch panels are broadly adopted.

Touch panels usually include on-cell touch panels and in-cell touch panel. FIG. 1 is a cross-section view of one conventional in-cell touch panel. The in-cell touch panel includes a thin film transistor (TFT) array substrate 110, a color filtering substrate 120, and a liquid crystal layer 130 arranged between the boost circuit 110 and the color filtering substrate 120.

The color filtering substrate 120 includes a first substrate 121, a touch structure layer 122, a black matrix pattern layer 123, a color filtering pattern 124, and a common electrode 125, with respect to the liquid crystal layer 130, arranged from a further direction toward a closer direction. With respect to the liquid crystal layer 130, the TFT array substrate 110 includes a pixel array 112 and a second substrate 111 arranged from a closer direction toward a further direction. As the touch structure layer 122 is configured within the first substrate 121, though the touch panel can be thinner, this configuration also results in several problems, such as a lower SNR and a higher cost.

SUMMARY

In one aspect, an in-cell touch panel, comprising: a first substrate comprising a plurality of displaying pixels having thin film transistors (TFTs) and pixel electrodes; a second substrate facing toward the first substrate, the second substrate comprising a plurality of color filtering patterns corresponding to the displaying pixels; a liquid crystal layer arranged between the first substrate and the second substrate; a plurality of touching units arranged between the TFTs and the first substrate, and the touching units are separated from each other; and a plurality of sensing areas and driving areas arranged below the pixel electrodes, and the sensing areas and the driving areas connect to the touching units via conductive through holes.

In another aspect, a liquid crystal device comprising an in-cell touch panel and a backlight module arranged opposite to the in-cell touch panel, the backlight module provides displaying light sources to the in-cell touch panel, the in-cell touch panel comprising: a first substrate comprising a plurality of displaying pixels having thin film transistors (TFTs) and pixel electrodes; a second substrate facing toward the first substrate, the second substrate comprising a plurality of color filtering patterns corresponding to the displaying pixels; a liquid crystal layer arranged between the first substrate and the second substrate; a plurality of touching units arranged between the TFTs and the first substrate, and the touching units are separated from each other; and a plurality of sensing areas and driving areas arranged below the pixel electrodes, and the sensing areas and the driving areas connect to the touching units via conductive through holes.

Wherein the touching unit comprises black matrix.

Wherein the black matrix is made by Cr and/or CrOx.

Wherein the driving area comprises a plurality of common electrodes.

Wherein the sensing area comprises a plurality of common electrodes.

Wherein one surface of the first substrate operates as a touching surface.

Wherein the in-cell touch panel further comprises a plurality of first conductive lines for connecting the common electrodes in the driving areas along a first direction, and the first conductive lines round the sensing areas.

Wherein the in-cell touch panel further comprises a plurality of second conductive lines for connecting the common electrodes in the driving areas along a second direction. In addition, the plurality of second conductive lines is for connecting the common electrodes in the sensing areas along the second direction.

Wherein the common electrodes operates as a displaying circuit in an image displaying stage of the in-cell touch panel, and the common electrodes operates as a touch sensing circuit in a touch sensing stage of the in-cell touch panel.

In view of the above, regarding the in-cell touch panel and the liquid crystal device, the black matrix of the touching units are formed on one surface of the TFT array substrate, which operates as the touching surface. When being touched, the sensing area and the driving area are on the same side of the TFT array substrate to avoid the interference caused by parasitic capacitors due to the twisted liquid crystal. Thus, the SNR is enhanced. In addition, the BM also can block the lights, and thus the mask is not needed so as to reduce the cost.

DETAILED DESCRIPTION OF THE EMBODIMENTS

Figure 1:
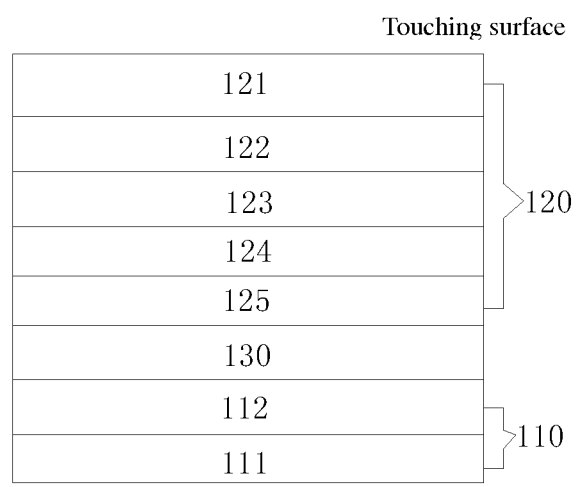
FIG. 1 is a cross section view of one conventional in-cell touch panel.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

Figure 2:
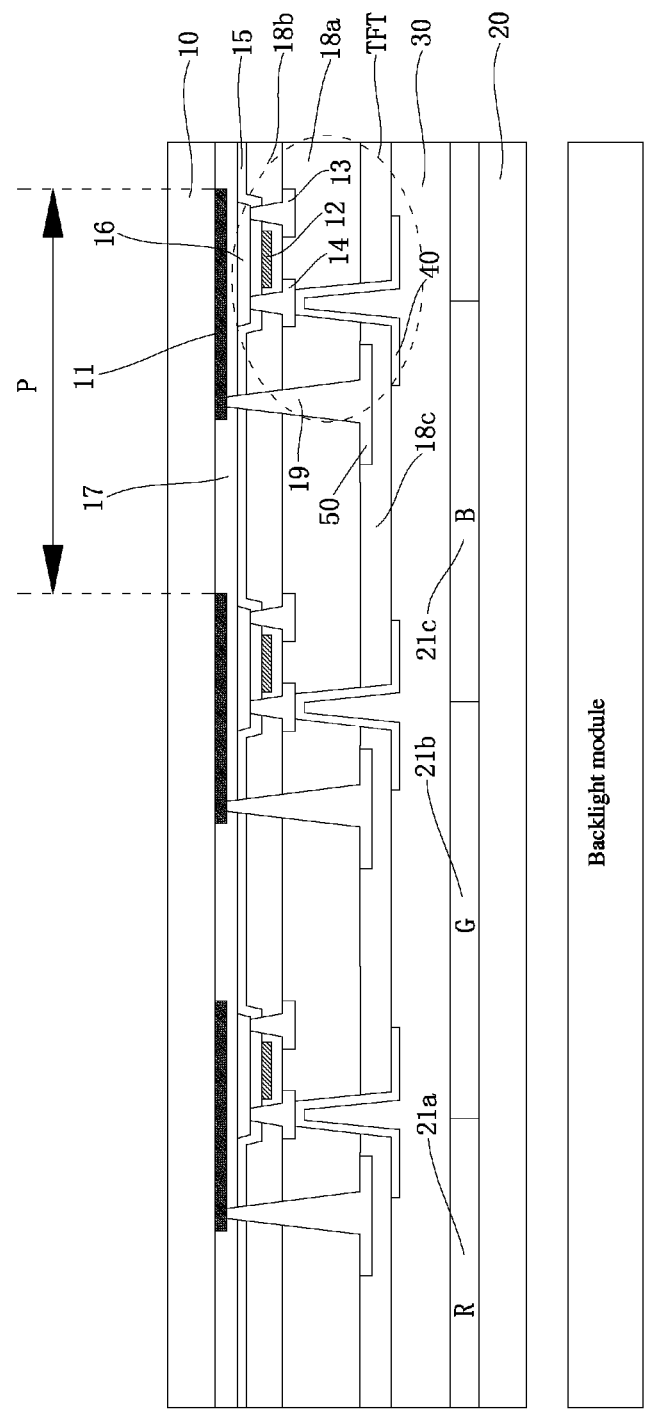
FIG. 2 is a cross section view of one area of the liquid crystal device incorporating the in-cell touch panel in accordance with one embodiment.

FIG. 2 is a cross section view of one area of the liquid crystal device (LCD) incorporating the in-cell touch panel in accordance with one embodiment.

As shown, the LCD includes the in-cell touch panel and the backlight module arranged opposite to the in-cell touch panel.

The backlight module provides the displaying light sources to the in-cell touch panel such that the in-cell touch panel is capable of displaying images.

In one embodiment, the in-cell touch panel is configured as below. The first substrate 10 is the TFT array substrate and the second substrate 20 is the color filtering substrate opposite to the array substrate 10. The liquid crystal layer 30 is arranged between the array substrate 10 and the second substrate 20. The in-cell touch panel also includes a grid black matrix (BM) 11 arranged on a surface of the first substrate 10 facing toward the second substrate 20. In addition, a plurality of gate lines (not shown) and a plurality of data lines (not shown) intersecting with each other are arranged above the BM 11. The TFTs are arranged at the intersecting points (or intersecting areas) of the gate lines and the data lines so as to connect to the pixel electrode 40 of the displaying pixels P. The BM 11 may be made by colorful conductive materials, such as Cr and/or CrOx.

Under the circumstance, TFTs includes a gate electrode 12, a source electrode 13 and a drain electrode 14. A gate insulation layer 15 is formed between the gate electrode 12 and the P—Si layer 16. The gate insulation layer 15 may contain dielectric material, such as $SiO_2$ and SiNx. An insulation layer 17 is formed between the BM 11 and the TFTs.

The common electrode 50 (or transparent electrode) electrically connects to the BM 11 via a conductive through hole 19 passing thought a first dielectric layer 18a, a second dielectric layer 18b, the gate insulation layer 15 and the insulation layer 17. The conductive through hole 19 may be filled with conductive material. Each of the common electrodes 50 corresponds to the displaying pixels P within the in-cell touch panel. A third dielectric layer 18c is formed between the common electrode 50 and the pixel electrodes 40. The common electrode 50 and the pixel electrodes 40 are made by transparent conductive material, such as ITO. The dielectric layers may be made by $SiO_2$, organic material, or SiNx.

Red (R), green (G), and blue (B) color filtering patterns 21a, 21b, and 21c are formed on the surface of the second substrate 20 facing toward the first substrate 10. The BM 11 surrounds each of the displaying pixels P so as to cover a non-display area including the gate lines, storage lines, and TFTs. Red (R), green (G), and blue (B) color filtering patterns 21a, 21b, and 21c are arranged in sequence and repeatedly so as to correspond to the displaying pixels P within the BM 11.

The touching operations will be described together with the above in-cell touch panel hereinafter.

Referring to FIG. 2, the displaying process of the in-cell touch panel includes an image displaying stage and a touch sensing stage. During the image displaying stage, gate signals are applied to the gate electrode 12 of the TFTs provided by the displaying pixels P to activate the P—Si layer 16. Correspondingly, the drain electrode 14 receives the data signals, which are applied by the data lines connecting to the source electrode 13, via the source electrode 13 that is separated from the drain electrode 14, and the drain electrode 14 connects to the pixel electrodes 40. Thus, the voltage of the data signals are applied to the pixel electrodes 40. Correspondingly, the alignment of the liquid crystals within the liquid crystal layer 30 are controlled by the voltages respectively applied to the pixel electrode 40 and the common electrode 50 so as to display images, such as a predetermined image. During the image displaying stage, the common electrode 50 and other components within the displaying pixels P cooperatively operate as the displaying circuit of the in-cell touch panel such that the in-cell touch panel can display images.

Afterward, in the touch sensing stage for each frame, the common electrode 50 of the in-cell touch panel operates as the touch sensing circuit, and the BM 11 of the in-cell touch panel operates as the touch unit.

Figure 3:
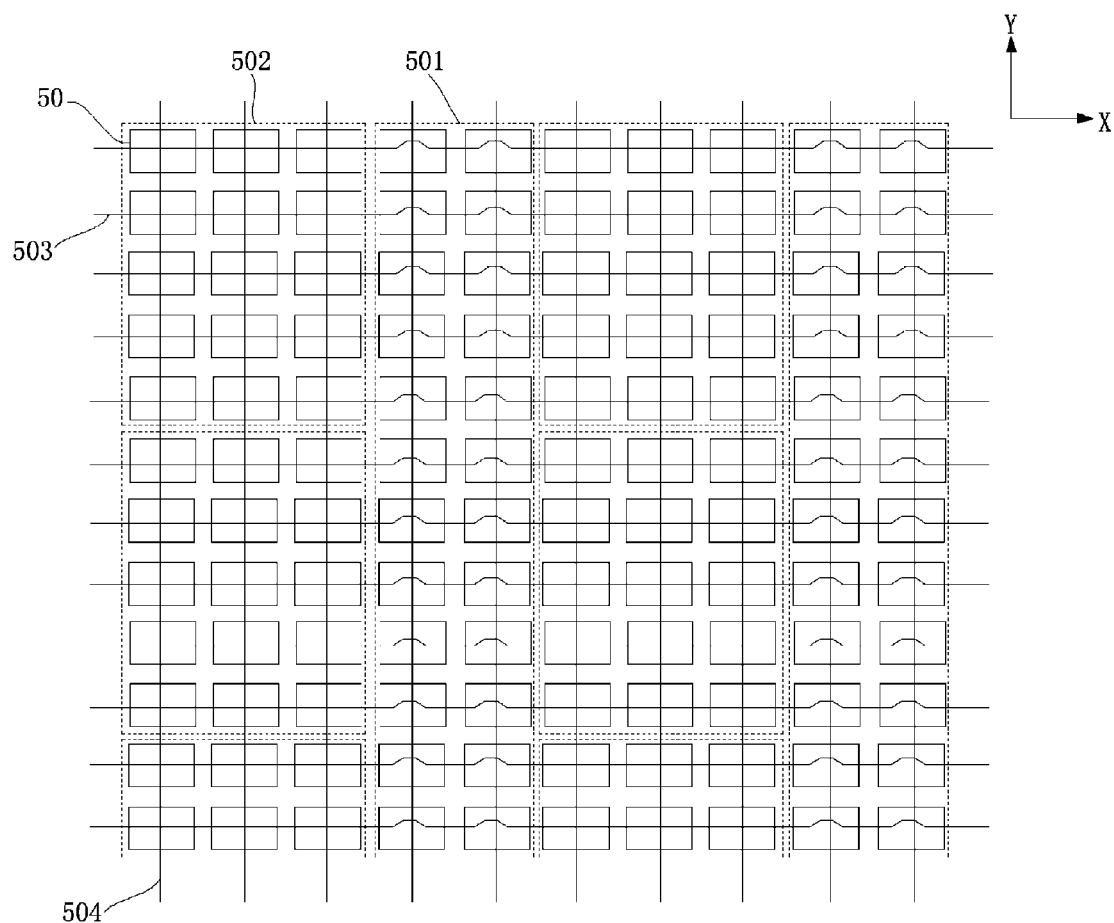
FIG. 3 is a schematic view of the driving area and the sensing area of the common electrode in accordance with one embodiment.

FIG. 3 is a schematic view of the driving area and the sensing area of the common electrode in accordance with one embodiment. It is to be noted that FIG. 3 only shows partial groups of the driving area and the sensing area. In addition, only partial common electrode is shown.

Referring to FIG. 3, the common electrode 50 is divided into the sensing area 501, and the driving area 502. A plurality of first conductive lines 503, such as metallic lines, electrically connects the common electrodes 50 of each column within the driving area 502 along X-direction, also the horizontal direction. But the first conductive lines 503 round the sensing area 501, that is, the first conductive lines 503 are not connected to the common electrodes 50 within the sensing area 501. A plurality of second conductive lines 504, such as metallic lines, electrically connects the common electrode 50 of each row within the sensing area 501 and the driving area 502 along Y-direction, also the vertical direction. As such, the grouped driving area 502 and the sensing area 501 cooperatively operate to form capacitive sensing nodes. When one of the capacitive sensing nodes of the in-cell touch panel is determined as being touched, the pattern of the touched capacitive sensing node is deemed as the touched pattern, such as the patterns of the in-cell touch panel is touched by fingers. That is, the common electrode 50 can operate as the common electrode of the displaying circuit of the in-cell touch panel in the image displaying stage. Also, the common electrode 50 can operate as the touch sensing circuit of the in-cell touch panel in the touch sensing stage after being grouped.

In addition, though the displaying circuit is described as operating in the image displaying stage and the touch sensing circuit is described as operating in the touch sensing stage, it can be understood that the image displaying stage and the touch sensing stage may be concurrent, such as partially or fully overlapped. In other embodiments, the image displaying stage and the touch sensing stage operates in different time periods.

Figure 4:
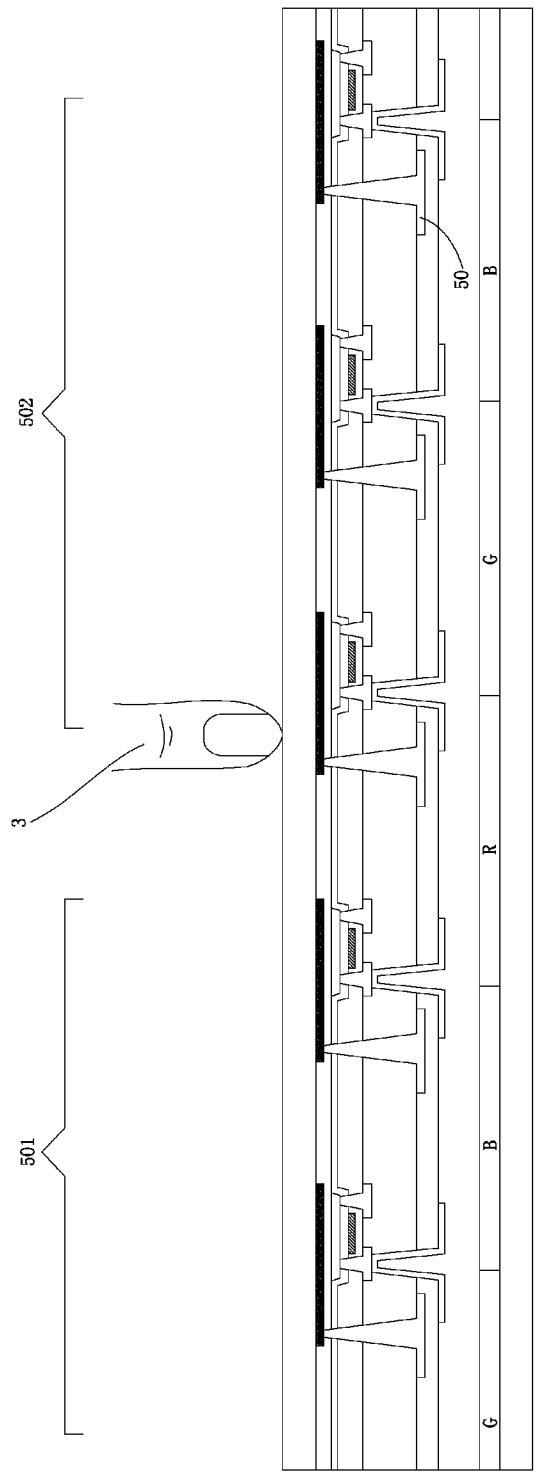
FIG. 4 is a schematic view of the displaying pixels within the driving area and the sensing area of the in-cell touch panel in accordance with one embodiment.

The touch sensing operations of the in-cell touch panel in accordance with one embodiment will be described hereinafter with reference to FIG. 4. FIG. 4 is a schematic view of the displaying pixels within the driving area and the sensing area of the in-cell touch panel in accordance with one embodiment.

Referring to FIGS. 3 and 4, in the touch sensing stage, the driving signals applied to the first conductive lines 503 forms an electric field between the common electrode 50 of the sensing area 501 and the common electrode 50 of the driving area 502 by the touch unit, i.e., the BM 11, touched by the finger 3 and the conductive through hole 19. The common electrode 50 of the sensing area 501 connects to a sensing amplifier (not shown), such as charge amplifiers. The charges are filled into the common electrode 50 of the sensing area 501, and the charge amplifier converts the filled charges into measurable voltage. The measurable voltage converted from the filled charges is determined by the proximity of the touch object, such as the finger 3, and the driving area 502, sensing area 501. In this way, the measurable voltage provides commands toward the in-cell touch panel.

In view of the above, in the claimed invention, the BM operates as the touch unit formed at one surface of the TFT array substrate, i.e., the first substrate 10 of FIG. 2, and one surface of the TFT array substrate operates as the touching surface. The sensing area and the driving area are on the same side of the TFT array substrate to avoid the interference caused by parasitic capacitors due to the twisted liquid crystal. Thus, the SNR is enhanced. In addition, the BM also can block the lights, and thus the mask is not needed so as to reduce the cost.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An in-cell touch panel, comprising:
   a first substrate comprising a plurality of displaying pixels having thin film transistors (TFTs) and pixel electrodes;
   a second substrate facing toward the first substrate, the second substrate comprising a plurality of color filtering patterns corresponding to the displaying pixels;
   a liquid crystal layer arranged between the first substrate and the second substrate;
   a plurality of touching units arranged between the TFTs and the first substrate, and the touching units are separated from each other; and
   a plurality of sensing areas and driving areas arranged below the pixel electrodes, and the sensing areas and the driving areas connect to the touching units via conductive through holes; and
   wherein the touching unit comprises black matrix, both of the driving area and the sensing area comprise a plurality of common electrodes, and the common electrode electrically connects to the black matrix via the conductive through hole passing through at least a first dielectric layer and a second dielectric layer.

2. The in-cell touch panel as claimed in claim 1, wherein the black matrix is made by Cr and/or CrOx.

3. The in-cell touch panel as claimed in claim 1, wherein one surface of the first substrate operates as a touching surface.

4. The in-cell touch panel as claimed in claim 1, wherein the in-cell touch panel further comprises a plurality of first conductive lines for connecting the common electrodes in the driving areas along a first direction, and the first conductive lines round the sensing areas.

5. The in-cell touch panel as claimed in claim 4, wherein the in-cell touch panel further comprises a plurality of second conductive lines for connecting the common electrodes in the driving areas along a second direction.

6. The in-cell touch panel as claimed in claim 5, wherein the in-cell touch panel further comprises a plurality of second conductive lines for connecting the common electrodes in the sensing areas along a second direction.

7. The in-cell touch panel as claimed in claim 1, wherein the common electrodes operates as a displaying circuit in an image displaying stage of the in-cell touch panel, and the common electrodes operates as a touch sensing circuit in a touch sensing stage of the in-cell touch panel.

8. A liquid crystal device comprising an in-cell touch panel and a backlight module arranged opposite to the in-cell touch panel, the backlight module provides displaying light sources to the in-cell touch panel, the in-cell touch panel comprising:
   a first substrate comprising a plurality of displaying pixels having thin film transistors (TFTs) and pixel electrodes;
   a second substrate facing toward the first substrate, the second substrate comprising a plurality of color filtering patterns corresponding to the displaying pixels;
   a liquid crystal layer arranged between the first substrate and the second substrate;
   a plurality of touching units arranged between the TFTs and the first substrate, and the touching units are separated from each other; and
   a plurality of sensing areas and driving areas arranged below the pixel electrodes, and the sensing areas and the driving areas connect to the touching units via conductive through holes; and
   wherein the touching unit comprises black matrix, both of the driving area and the sensing area comprise a plurality of common electrodes, and the common electrode electrically connects to the black matrix via the conductive through hole passing through at least a first dielectric layer and a second dielectric layer.

9. The liquid crystal device as claimed in claim 8, wherein the black matrix is made by Cr and/or CrOx.

10. The liquid crystal device as claimed in claim 8, wherein one surface of the first substrate operates as a touching surface.

11. The liquid crystal device as claimed in claim 8, wherein the in-cell touch panel further comprises a plurality of first conductive lines for connecting the common electrodes in the driving areas along a first direction, and the first conductive lines round the sensing areas.

12. The liquid crystal device as claimed in claim 11, wherein the in-cell touch panel further comprises a plurality of second conductive lines for connecting the common electrodes in the driving areas along a second direction.

13. The liquid crystal device as claimed in claim 12, wherein the in-cell touch panel further comprises a plurality of second conductive lines for connecting the common electrodes in the sensing areas along a second direction.

14. The liquid crystal device as claimed in claim 8, wherein the common electrodes operates as a displaying circuit in an image displaying stage of the in-cell touch panel, and the common electrodes operates as a touch sensing circuit in a touch sensing stage of the in-cell touch panel.

* * * * *